(12) United States Patent
Kwon et al.

(10) Patent No.: US 7,856,031 B2
(45) Date of Patent: Dec. 21, 2010

(54) METHOD AND APPARATUS FOR GUARANTEEING FAIRNESS REGARDING ACCESS TO MEDIUM AMONG STATIONS IN WLAN

(75) Inventors: Chang-yeul Kwon, Yongin-si (KR); Chil-youl Yang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 818 days.

(21) Appl. No.: 11/593,516

(22) Filed: Nov. 7, 2006

(65) Prior Publication Data

US 2007/0116022 A1 May 24, 2007

Related U.S. Application Data (60) Provisional application No. 60/733,798, filed on Nov. 7, 2005.

(30) Foreign Application Priority Data

Mar. 2, 2006 (KR) .................. 10-2006-0019989

(51) Int. Cl.
*H04L 12/28* (2006.01)
*H04L 12/43* (2006.01)
*H04J 3/02* (2006.01)

(52) U.S. Cl. .................. 370/461; 370/431; 370/462

(58) Field of Classification Search ............ 370/431, 370/462, 461
See application file for complete search history.

(56) References Cited

U.S. PATENT DOCUMENTS 7,039,068 B1* 5/2006 Halasz .................. 370/473
2003/0128684 A1* 7/2003 Hirsch et al. ............ 370/338
2005/0141540 A1* 6/2005 Li et al. .................. 370/437
2005/0226270 A1* 10/2005 Liu et al. ................ 370/469
2005/0232275 A1* 10/2005 Stephens ................ 370/394
2006/0018332 A1* 1/2006 Kakani et al. ............ 370/428
2006/0126545 A1* 6/2006 Nanda .................. 370/310
2006/0227801 A1* 10/2006 Nanda et al. ............ 370/447
2006/0251183 A1* 11/2006 Soffer .................. 375/267
2006/0291498 A1* 12/2006 Stephens ................ 370/437
2007/0010237 A1* 1/2007 Jones et al. ............ 455/422.1

OTHER PUBLICATIONS

ANSI/IEEE Std 802.11, 1999 Edition, "Part 11: Wireless LAN Medium Access Control (MAC) and Physical Layer (PHY) Specifications".*

(Continued)

*Primary Examiner*—Ayaz R Sheikh
*Assistant Examiner*—Tarell Hampton
(74) *Attorney, Agent, or Firm*—Sughrue Mion, PLLC (57) ABSTRACT

A method and apparatus for guaranteeing fairness regarding access to a medium among a plurality of stations in a wireless local area network (WLAN) where a plurality of high throughput (HT) stations and a plurality of 802.11 legacy stations coexist are provided. In the WLAN, information that allows a plurality of hearing legacy stations and a plurality of hearing HT stations which receive a data frame having an HT format transmitted by a transmitting HT station to fairly contend for use of a medium is transmitted as a frame having a format that can be interpreted by all the legacy HT stations. Therefore, the legacy stations can contend for a medium under the same conditions as the HT stations.

13 Claims, 10 Drawing Sheets

OTHER PUBLICATIONS

Li, Z.; Nandi, S.; Gupta, A.K., "Improving fairness in IEEE 802.11 using enhanced carrier sensing," Communications, IEE Proceedings-, vol. 151, No. 5, pp. 467-472, Oct. 24, 2004.*

Heindl, Arman et al: "The Impact of Backoff, and Beacons on the Performance of IEEE 802.11 Wireless LANs", Computer Performance and Dependability Symposium, 2000. IPDS 2000, Proceedings, IEEE International, Mar. 27-9, 2000, pp. 103-112.

Wall, Joshua et al: "Adaptive Multimedia Packet Transmission for Broadband IEEE 802.11 Wireless LANs", Personal, Indoor and Mobile Radio Communications, 2006 IEEE 17th International Symposium on Sep. 2006, pp. 1-5.

Utsunomiya, Yoriko, et al: "A MAC Protocol for Coexistence between 20/40 MHz STAs for High Throughput WLAN", Vehicular Technology Conference, 2006. VTC 2006-Spring (May), IEEE 63rd, vol. 3, 2006, pp. 1136-1140.

"HT PHY Specification", Enhanced Wireless Consortium, ver. 1.27 (Dec. 23, 2005).3

* cited by examiner

METHOD AND APPARATUS FOR GUARANTEEING FAIRNESS REGARDING ACCESS TO MEDIUM AMONG STATIONS IN WLAN

CROSS-REFERENCE TO RELATED APPLICATION

This application claims priority from Korean Patent Application No. 10-2006-0019989, filed on Mar. 2, 2006 in the Korean Intellectual Property Office, and U.S. Provisional Application No. 60/733,798, filed on Nov. 7, 2005 in the U.S. Patent & Trademark Office, the disclosures of which are incorporated herein in their entirety by reference.

BACKGROUND OF THE INVENTION

1. Field of the Invention

Methods and apparatuses consistent with the present invention relate to wireless local area networks (WLANs), and more particularly, to preventing a high throughput (HT) station and an 802.11 legacy station from colliding with each other in a WLAN where HT stations and 802.11 legacy stations coexist.

2. Description of the Related Art

In a wireless local area network (WLAN), Carrier Sense Multiple Access with Collision Avoidance (CSMA/CA)-based Medium Access Control (MAC) methods are widely used. CSMA/CA is a type of data transmission method in which, even when no data is currently being transmitted via a network cable, a signal for determining whether data is currently being transmitted via the network cable is transmitted and data is transmitted only after the signal is determined to have been successfully transmitted without collision.

In detail, according to CSMA/CA, a first station detects a sub-carrier indicating whether there is a station currently transmitting data. If there is a station currently transmitting data, the first station stands by for a predetermined amount of time, determines whether there is a sub-carrier transmitted by another station, and begins to transmit data if no sub-carrier is currently being transmitted.

According to CSMA/CA, both a physical carrier sensing method and a virtual carrier sensing method are used at the same time. The physical carrier sensing method is a carrier sensing method in which a physical layer (PHY) determines whether a power of higher than a predefined value has been received and notifies an MAC layer of whether a medium is currently busy or idle based on the results of the determination, and the virtual carrier sensing method is a carrier sensing method in which, if an MAC protocol data unit (MPDU) can be properly extracted from a received Physical Layer Convergence Procedure (PLCP) protocol data unit (PPDU), stations interpret one of a plurality of header fields of the MPDU, i.e., a duration/identifier field of the MPDU, and determine whether a medium is currently busy based on the results of the interpretation. Stations use both the physical carrier sensing method and the virtual carrier sensing method to determine whether a medium is currently busy and do not attempt to access the medium if the medium is determined as being busy.

Figure 1A:
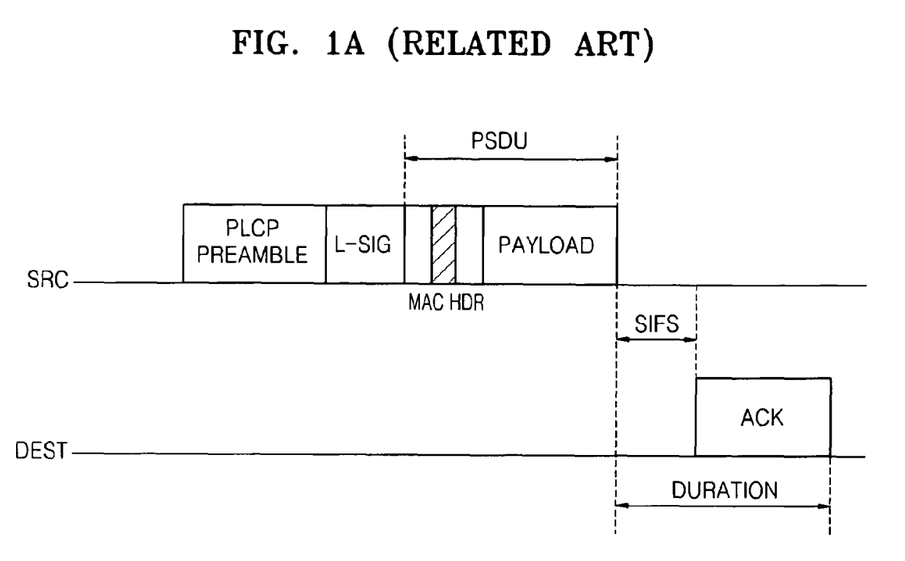
FIGS. 1A and 1B are diagrams illustrating the formats of typical frames preventing a plurality of stations in a WLAN from colliding with each other.

Referring to FIG. 1A, an MAC header of a data frame which can be transmitted via a typical IEEE 802.11 WLAN includes duration information specifying the time required to receive an acknowledgement (ACK) frame in return for the data frame after the transmission of the data frame. A plurality of stations which receive the data frame interpret the MAC header of the data frame and do not attempt to access a medium during a predetermined time period specified in the MAC header of the data frame. Therefore, the stations can be prevented from colliding with one another. Due to the characteristics of a WLAN, all of a plurality of stations in a WLAN can receive frames regardless of whether the frames are destined for only one of the stations.

Figure 1B:
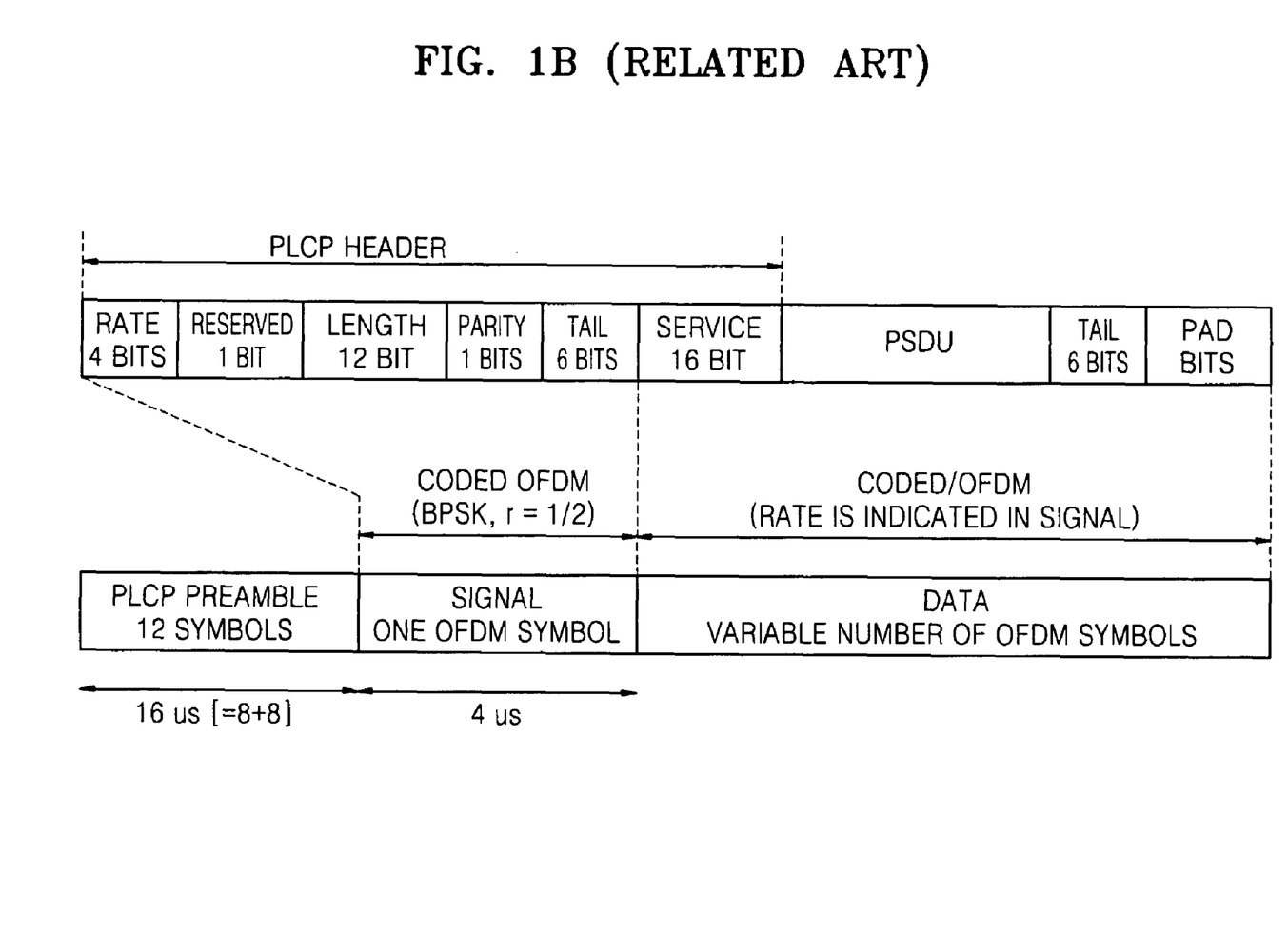
Figure 2:
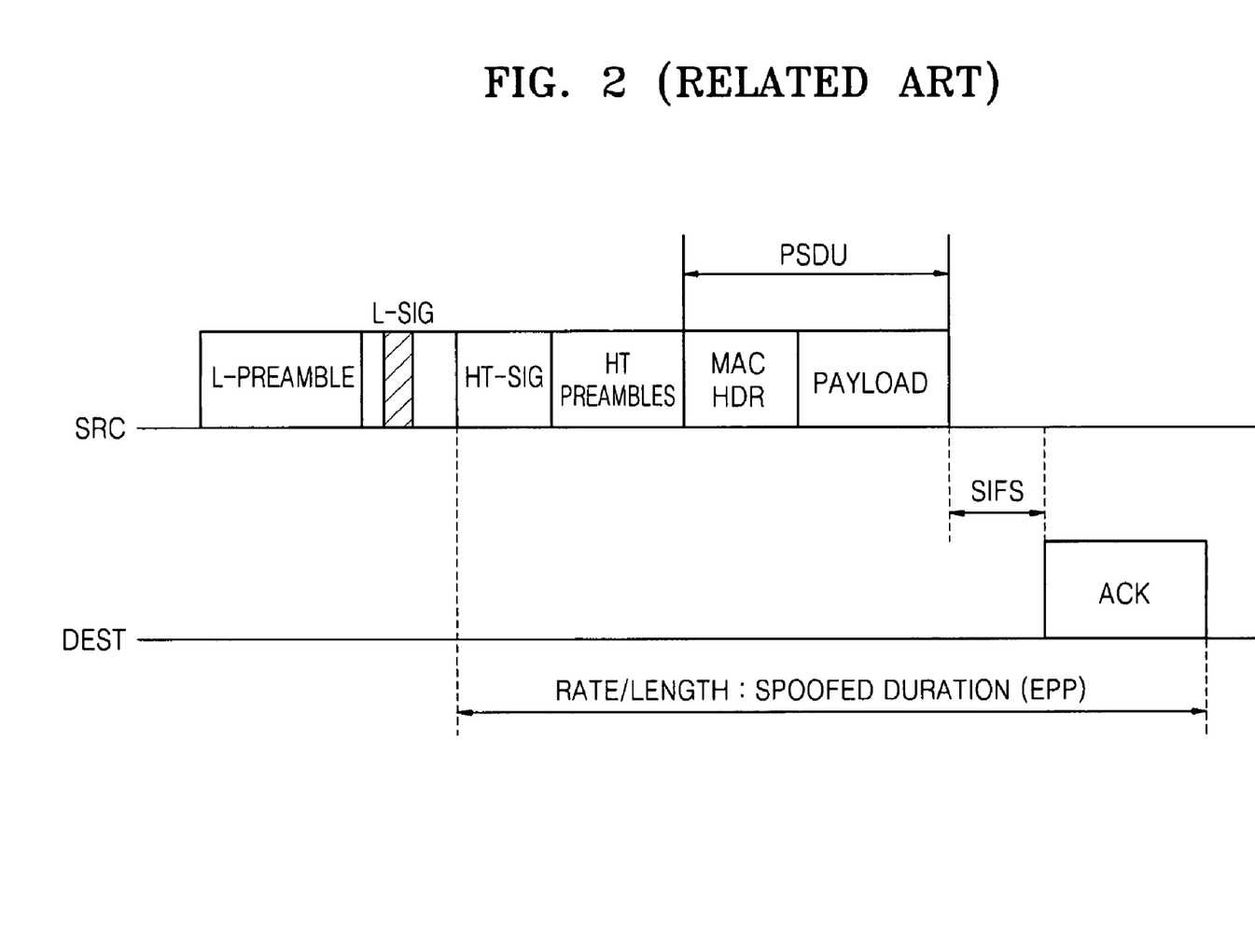
FIG. 2 is a diagram illustrating the format of a typical frame preventing a plurality of stations in a WLAN where HT stations and legacy station coexist from colliding with each other.

FIG. 1B is a diagram illustrating the format of a data frame which is used in a typical IEEE 802.11a network. Referring to FIG. 1B, a signal field of the IEEE 802.11a frame includes rate information (RATE) and length information (LENGTH). Thus, duration information of the data frame can be obtained by analyzing the rate information and the length information of the data frame. Therefore, the virtual carrier sensing method can be realized.

The virtual carrier sensing method can be effectively applied to CSMA/CA only when an MPDU/PHY service data unit (PSDU) can be interpreted properly without any errors, i.e., only when the value of an MAC header of a frame can be read out properly.

When errors occur due to an unstable channel state during the transmission of a frame at a high transmission rate by a transmitting station, or when a receiving station cannot properly handle the high transmission rate, a received MPDU/PSDU cannot be interpreted properly. In this case, the virtual carrier sensing cannot be used, and thus, the performance of CSMA/CA decreases. Therefore, a plurality of hearing stations are highly likely to collide with one another.

An HT station is a station such as a multi-input multi-output (MIMO) station which has better data transmission capabilities than an existing legacy station such as a station based on the IEEE 802.11a/b/g standard.

Figure 3:
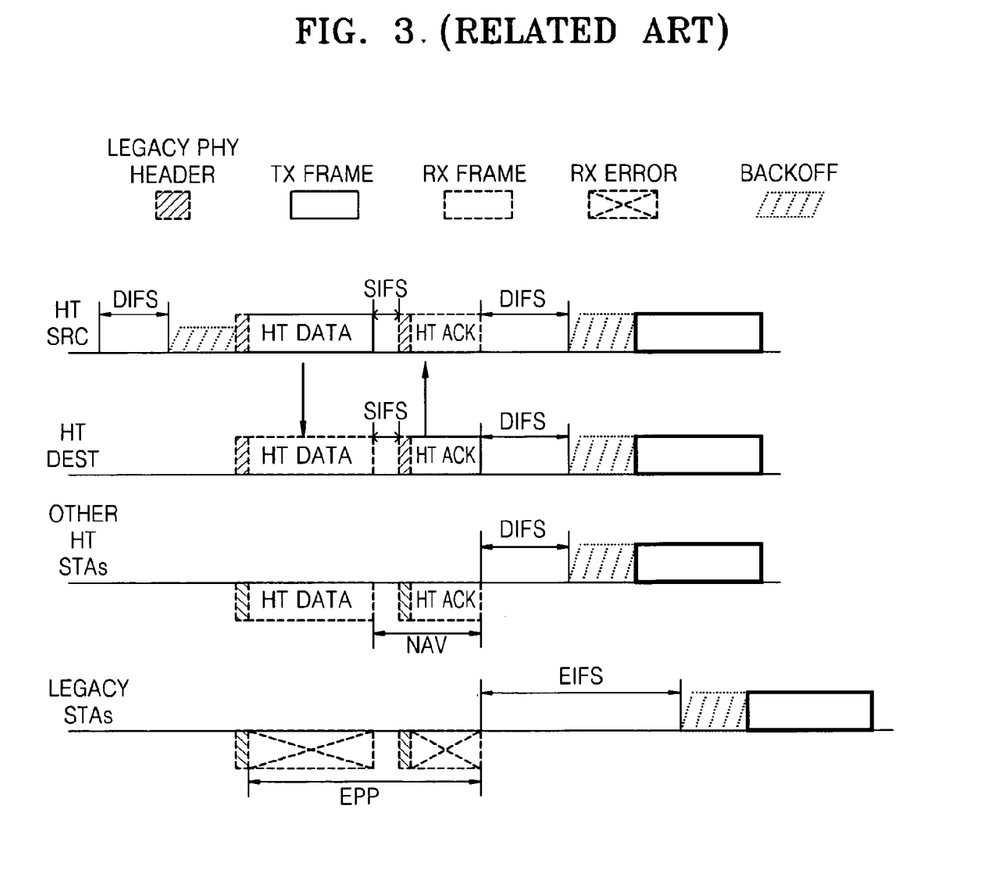
FIG. 3 is a diagram for explaining a related art method of controlling access of a plurality of stations to a medium by using the frame illustrated in FIG. 2.

In order to address the problem of such a high probability of a plurality of stations colliding with one another in a WLAN, a method based on the IEEE 802.11a standard which is currently being introduced has been suggested in which, when a plurality of HT stations and a plurality of legacy stations coexist in a WLAN, as illustrated in FIG. 3, a header having a legacy format (L-Preamble, L-SIG) is used as a PHY header of a frame to be transmitted and duration information which is previously included in an existing MAC header is included in the PHY header of the frame to be transmitted such that the duration information can represent the time required to receive an ACK frame after L-SIG. The duration information will now be referred to as extended PHY protection (EPP) information.

FIG. 3 is a diagram for explaining a related art method of controlling the access of a plurality of stations to a medium by using extended PHY protection (EPP) information. Referring to FIG. 3, a plurality of stations can be prevented from colliding with one another by using the EPP information. However, the method illustrated in FIG. 3 results in unfairness regarding access to the medium among the stations.

Referring to FIG. 3, a plurality of legacy stations can interpret a PHY header of a data frame having an HT format. However, the legacy stations cannot interpret the remaining portions of the data frame, thus causing an error. Then a PHY layer (i.e., a baseband layer) notifies an MAC layer of the legacy stations that an error has occurred. The time when the PHY layer notifies the MAC layer of the legacy stations that an error has occurred coincides with the time when EPP information included in the data frame expires. Then the MAC layer of the legacy stations stands by for a predetermined amount of time corresponding to an extended interframe space (EIFS), whereas a plurality of HT stations stand by only for a predetermined amount of time corresponding to a distributed coordination function (DCF) interframe space (DIFS) and then contend for the use of the medium. Here, an EIFS is equal to the sum of a short interframe space (SIFS), the time (hereinafter referred to as the ACK reception time) required to receive an ACK frame in return for a data frame.

In other words, when an error occurs because the legacy stations cannot interpret a data frame having the HT format, the MAC layer of the legacy stations allows the legacy stations to begin to perform a backoff operation an EIFS (whose duration is 94 μs as prescribed in the IEEE 802.11a standard) after the reception of the data frame, whereas an MAC layer of the HT stations allows the HT stations to begin to perform a backoff operation a DIFS (whose duration is 34 μs as prescribed in the IEEE 802.11a standard) after the reception of the data frame. Therefore, the legacy stations cannot participate in the contention for the access to the medium under fair conditions. A CCA state of the legacy stations becomes idle after the reception of first HT data. However, since the time period specified in EPP information has not yet elapsed, the legacy stations do not notify the MAC layer that an error has occurred until a time-out period of the timers of the legacy stations elapses, regardless of whether the legacy stations receive an ACK frame having the HT format or an ACK frame having the legacy format.

In short, legacy stations can start an EIFS only after EPP information expires, i.e., after the reception of an ACK frame, whereas HT stations can start a DIFS after the reception of the ACK frame. Therefore, legacy stations are disadvantageous to HT stations when participating in contention for the use of a medium.

SUMMARY OF THE INVENTION

The present invention provides a method and apparatus for guaranteeing fairness regarding access to a medium among a plurality of stations in a WLAN where HT stations and legacy stations coexist.

According to an aspect of the present invention, there is provided a method of providing information regarding MAC to a plurality of stations in a WLAN where a plurality of HT stations and a plurality of legacy stations having different data transmission capabilities from the HT stations coexist. The method includes adaptively generating information that allows a plurality of legacy and HT stations which receive a data frame having an HT format to simultaneously participate in contention for use of a medium according to a length of an ACK frame transmitted in response to the data frame; and transmitting the adaptively generated information to the WLAN as a frame having a format that can be interpreted by the legacy and HT stations.

If the duration of an EIFS is longer than the sum of the time required to receive an ACK frame having a legacy format and the duration of an SIFS, the adaptively generating may include calculating a beginning point of an EIFS of a plurality of legacy stations which receive the data frame so that the legacy and HT stations which receive the data frame can initiate a backoff operation at the same time.

The beginning point of the EIFS of the legacy stations may be the time when the transmission of the data frame is concluded, and the transmitting may include inserting the information regarding the beginning point of the EIFS of the legacy stations into a PHY header which is of the data frame and has a legacy format and transmitting the resulting data frame to the WLAN.

The ACK frame having the legacy format may be a block ACK frame for a plurality of frames, the data frame may be the first frame of the plurality of frames, the beginning point of the EIFS of the legacy stations may be the time when the transmission of the last frame of the plurality of frames is concluded, and the transmitting may include inserting information regarding the beginning point of the EIFS of the legacy stations into a PHY header which is of the first frame of the plurality of frames and has the legacy format and transmitting the plurality of frames to the WLAN.

If the duration of an EIFS is shorter than the sum of the time required to receive an ACK frame having a legacy format and the duration of an SIFS, the adaptively generating may include generating a reset frame having the legacy format, wherein the reset frame resets network allocation vectors (NAVs) of all the hearing stations which receive the data frame.

The transmitting may include transmitting the reset frame an SIFS after the reception of the ACK frame having the legacy format is concluded.

The reset frame may be a contention free (CF)-end frame or a quality-of-service (QOS) null frame.

The legacy stations may be IEEE 802.11a/b/g stations.

The HT stations may be multi-input-multi-output (MIMO) stations.

According to another aspect of the present invention, there is provided a computer-readable recording medium storing a computer program for executing the method.

According to another aspect of the present invention, there is provided an high throughput (HT) station which transmits a data frame having an HT format to a WLAN where a plurality of HT stations and a plurality of legacy stations having different data transmission capabilities from the HT stations coexist. The HT station includes an information generation unit which adaptively generates information that allows a plurality of legacy and HT stations which receive the data frame to simultaneously participate in contention for the use of a medium according to the length of an ACK frame transmitted in return for the data frame; and an information providing unit which transmits the adaptively generated information to the WLAN as a frame having a format that can be interpreted by the legacy and HT stations.

The information generation unit may include a comparator which compares the duration of an EIFS with the sum of the time required to receive an ACK frame in return for the data frame and the duration of an SIFS; and a calculator which calculates a beginning point of an EIFS of a plurality of legacy stations which receive the data frame so that the legacy and HT stations which receive the data frame can initiate a backoff operation at the same time.

If the duration of an EIFS is shorter than the sum of the time required to receive an ACK frame having a legacy format and the duration of an SIFS, the information providing unit may generate a reset frame having the legacy format, wherein the reset frame resets NAVs of all the stations which receive the data frame.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 4:
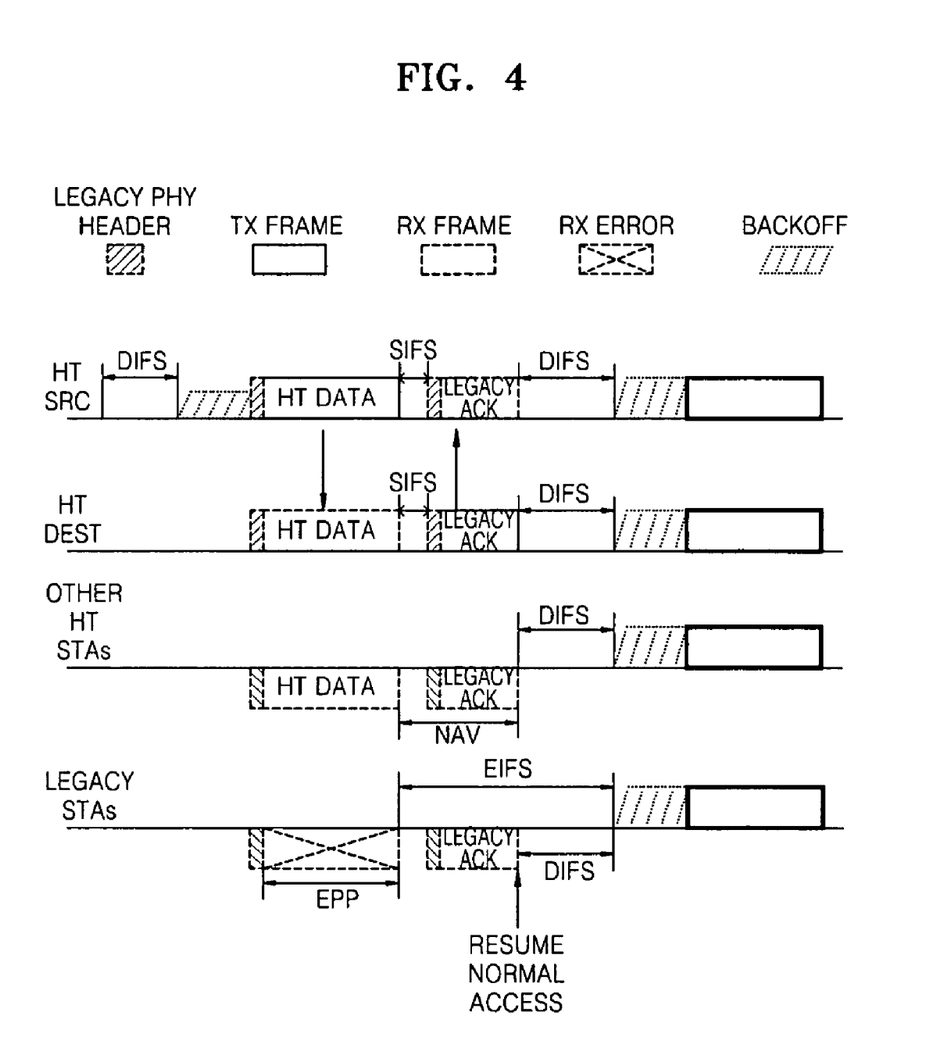
FIG. 4 is a diagram for explaining a method of guaranteeing fairness regarding access to a medium among a plurality of stations according to an exemplary embodiment of the present invention.

FIG. 4 is a diagram for illustrating a method of guaranteeing fairness regarding medium among a plurality of stations in a WLAN according to an exemplary embodiment of the present invention. The WLAN includes an infrastructure basic service set (BSS) and an independent BSS (IBSS).

Referring to FIG. 4, a PHY header of a data frame having a legacy format includes extended PHY protection (EPP) information. According to the current embodiment of the present invention, the EPP information included in a PHY header of a data frame represents the time required to receive the data frame excluding the PHY header, whereas, in the related art, EPP information represents the time required to receive an ACK frame.

In detail, when a transmitting HT station transmits a data frame having an HT format, a plurality of HT stations which receive the data frame perform a backoff operation when a DIFS elapses after the reception of an ACK frame. On the other hand, a plurality of legacy stations which receive the data frame begin to count down an EIFS immediately after the reception of the data frame is concluded. An EIFS is equal to <SIFS+ACK reception time+DIFS>. Therefore, the legacy stations can initiate a backoff operation at the same time as the HT stations. In order to realize this mechanism, a receiving station is required to transmit an ACK frame having a legacy format in return for a data frame having the HT format. If the ACK frame has an HT format, the legacy stations initiate a new EIFS after receiving the ACK frame because the legacy stations cannot interpret an ACK frame having an HT format. Therefore, the HT stations must know in advance that they should use an ACK frame having a legacy format.

Figure 5A:
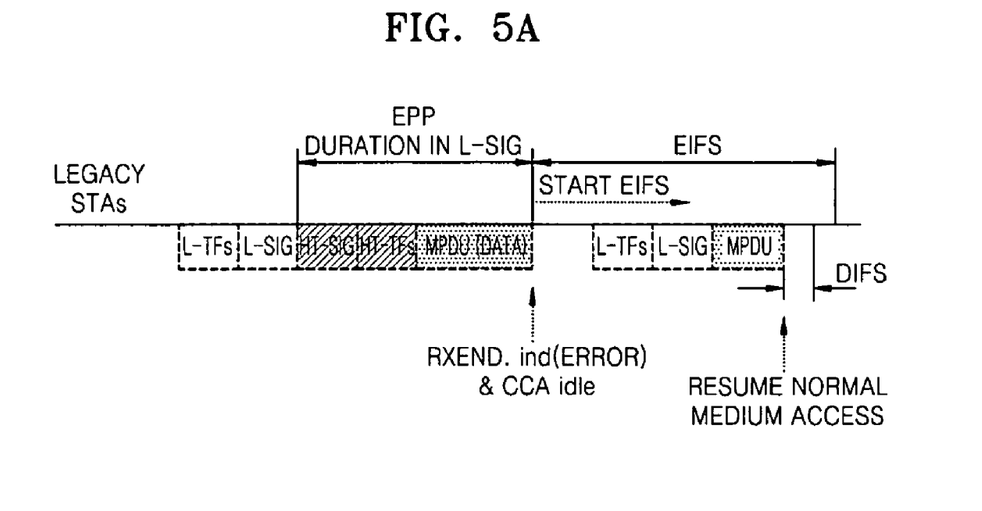
FIGS. 5A and 5B are diagrams for respectively explaining methods of controlling the access of a plurality of legacy stations to a medium according to exemplary embodiments of the present invention.
Figure 5B:
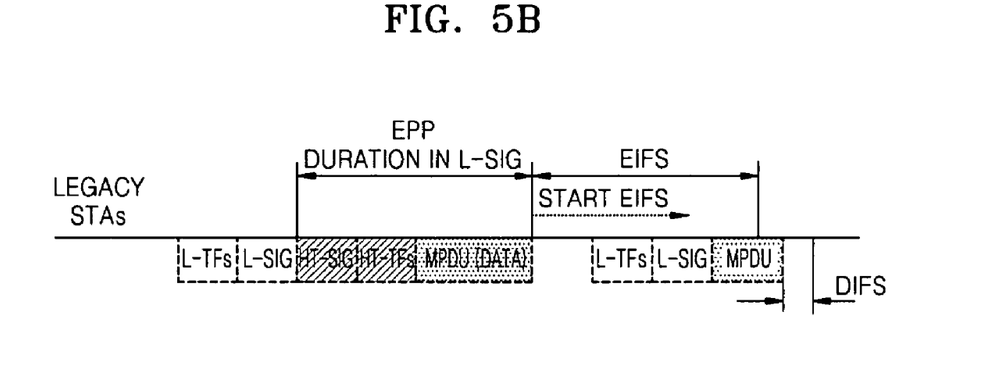

FIGS. 5A and 5B are diagrams for respectively explaining medium access control methods of a plurality of legacy stations according to exemplary embodiments of the present invention.

Referring to FIG. 5A, when the transmission of a data frame is concluded, a clear channel assessment (CCA) state of the legacy stations becomes idle, and EPP expires. AN MAC layer initiates an EIFS since it is notified that an error has occurred. As illustrated in FIG. 5A, before the EIFS ends, the legacy stations initiate a backoff operation a DIFS after receiving an ACK frame having a legacy format. A plurality of HT stations can interpret a frame having a legacy format and thus initiate a backoff operation at the same time as the legacy stations. As described above, an EIFS is generally equal to <SIFS+ACK reception time+DIFS>. However, since the ACK reception time can vary according to transmission rate, the situation illustrated in FIG. 5A is possible.

FIG. 5B is a diagram for explaining a medium access control method of a plurality of legacy stations according to an exemplary embodiment of the present invention when an ACK frame is too long to terminate the transmission of the ACK frame within an EIFS. Referring to FIG. 5B, a plurality of HT stations initiate a backoff operation when a DIFS elapses after the transmission of an ACK frame, whereas a CCA state of a plurality of legacy stations is still busy even after an EIFS of the legacy stations ends. Thus, an MAC layer is notified that an error has occurred, and the legacy stations initiate a new EIFS. Therefore, the problem of unfairness regarding access to a medium between the HT stations and the legacy stations arises. In this case, the use of an ACK frame having a legacy format may not be helpful to address the problem of unfairness regarding access to a medium between the HT stations and the legacy stations. It will now be described in detail how to address the problem of unfairness regarding access to a medium between the HT stations and the legacy stations with reference to FIG. 6.

Figure 6:
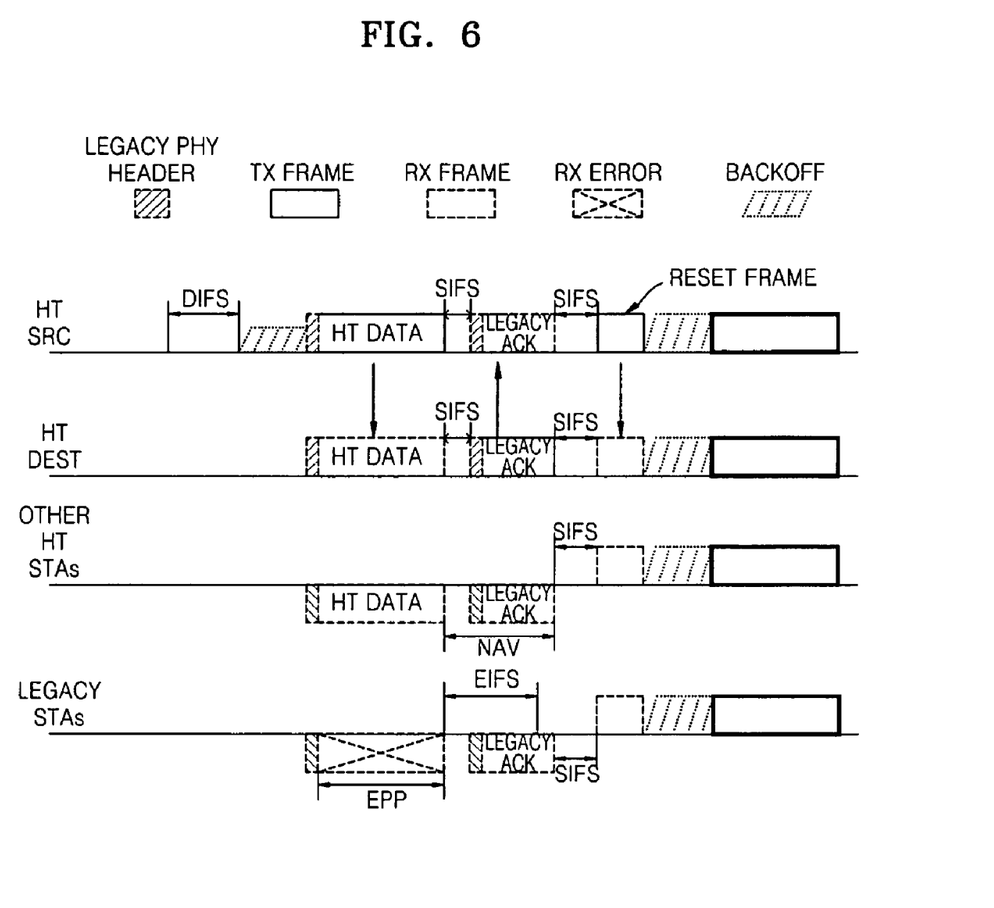
FIG. 6 is a diagram for explaining a method of guaranteeing fairness regarding access to a medium among a plurality of stations according to another exemplary embodiment of the present invention.

FIG. 6 is a diagram for explaining a method of guaranteeing fairness regarding access to a medium among a plurality of stations according to an exemplary embodiment of the present invention.

In general, a transmitting station which transmits a data frame can calculate an ACK frame reception time. Therefore, according to the current embodiment of the present invention, the transmitting station calculates the ACK frame reception time. Then, if an EIFS which begins after the transmission of the frame is expected to end before the reception of an ACK frame in return for the data frame is concluded, the transmitting station transmits a reset frame after the reception of the ACK frame. The reset frame resets the timers of all stations which receive the reset frame. FIG. 6 illustrates that the stations which receive the reset frame readily initiate a backoff operation. However, the stations which receive the reset frame may initiate a backoff operation when a predetermined time period elapses after receiving the reset frame.

In detail, a plurality of HT stations which receive an ACK frame start to count down a DIFS after receiving the ACK frame, whereas a plurality of legacy stations start to count down a new EIFS after receiving the ACK frame because an EIFS ends before the reception of the ACK frame. In anticipation that all this will happen, a transmitting station transmits a reset frame which resets the NAV timers of the HT stations and the legacy stations so that the HT stations and the legacy stations can contend fairly for access to a medium. Upon receiving the reset frame, the HT stations and the legacy stations reset their NAV timers regardless of whether they are currently counting a DIFS or an EIFS and can thus participate in contention for access to the medium at the same time.

The reset frame is not limited to a certain format. A contention free (CF)-end frame which resets an MAC timer or a quality-of-service (QOS)-null frame which includes only a payloadless header may be used as the reset frame.

Figure 7:
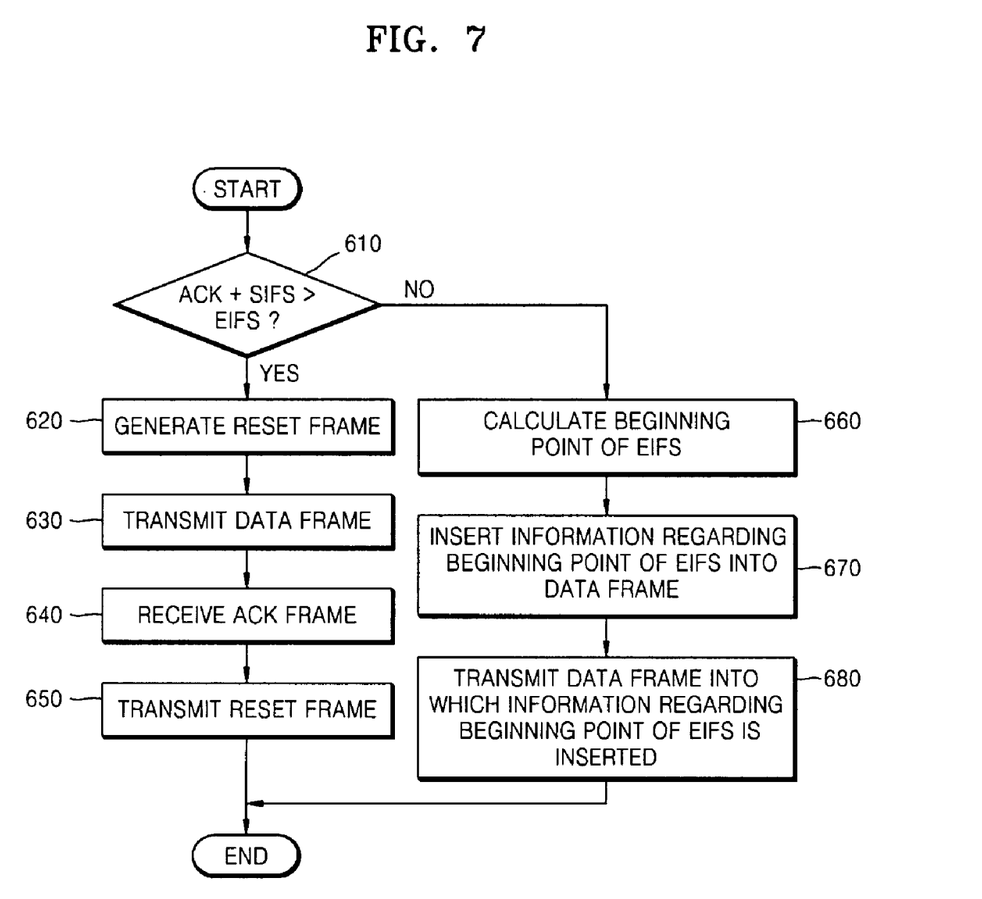
FIG. 7 is a flowchart illustrating an operation of an HT station according to an exemplary embodiment of the present invention.

FIG. 7 is a flowchart illustrating an operation of an HT station according to an exemplary embodiment of the present invention. Referring to FIG. 7, in operation 610, a transmitting HT station which attempts to transmit a data frame having an HT format via a WLAN compares the duration of an EIFS with the sum of the duration of an SIFS and the time (hereinafter referred to as the ACK frame reception time) required to receive an ACK frame in return for the data frame. The transmitting HT station determines based on the results of the comparison whether an EIFS of a plurality of legacy stations which receive the data frame will end before the reception of the ACK frame is concluded.

In operation 660, if the EIFS is larger than the sum of the SIFS and the ACK reception time, as illustrated in FIG. 5A, the transmitting HT station sets a beginning point of an EIFS such that a plurality of HT stations which receive the data frame and the legacy stations can initiate a backoff operation at the same time. In other words, the transmitting HT station generates EPP information such that the EPP can expire when the transmission of a frame including the EPP information by the transmitting HT station is concluded, inserts the EPP information into a PHY header having a legacy format in operation 670, and transmits the data frame into which the EPP information is inserted.

In operation 620, if the EIFS is smaller than the sum of the SIFS and the ACK reception time, the transmitting HT station generates a reset frame. When the reception of an ACK frame is concluded in operation 640, the transmitting HT station transmits the reset frame in operation 650. The generation of the reset frame may be performed in other than operation 620.

Figure 8:
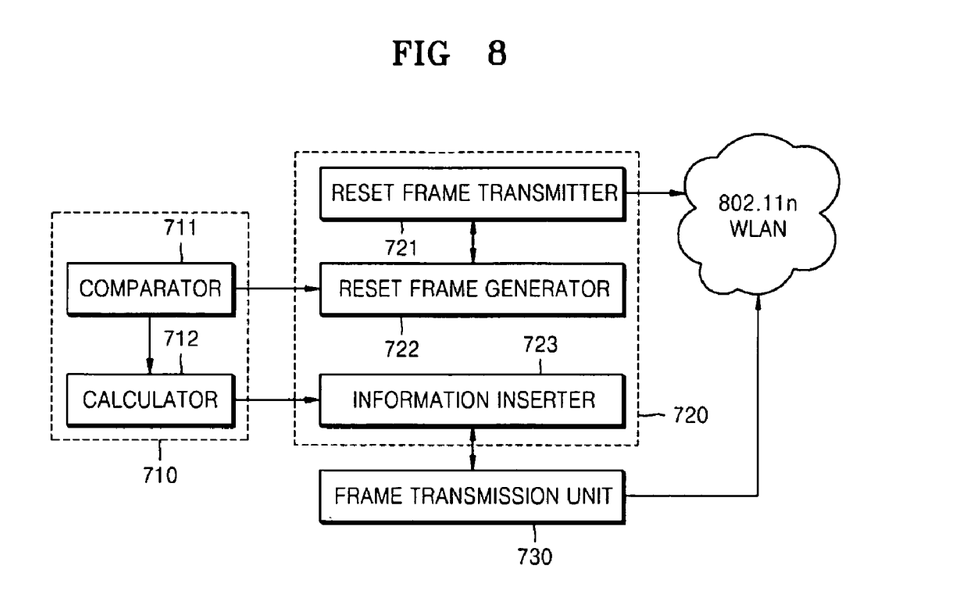
FIG. 8 is a block diagram of an HT station according to an exemplary embodiment of the present invention.

FIG. 8 is a block diagram of an HT station according to an exemplary embodiment of the present invention. Referring to FIG. 8, the HT station includes an information generation unit 710 which generates predetermined information that allows a plurality of stations which receive a data frame having an HT format to simultaneously participate in contention for access to a medium with reference to the length of an ACK frame transmitted by a receiving station; and an information providing unit which transmits the information generated by the information generation unit 710 to a WLAN as a frame having a legacy format so that both a plurality of HT stations which receive the data frame and a plurality of legacy stations which receive the data frame can interpret the information generated by the information generation unit 710.

In detail, the information generation unit 710 includes a comparator 711 and a calculator 712. The comparator 711 compares the duration of an EIFS with the sum of an ACK frame reception time and the duration of an SIFS. When the comparator 711 notifies the calculator 712 that the duration of an EIFS is longer than the sum of the ACK frame reception time and the duration of an SIFS, the calculator 712 sets EPP information to expire when the transmission of the data frame by the transmitting HT station ends.

The information providing unit 720 includes a reset frame transmitter 721, a reset frame generator 722, and an information inserter 723. When the comparator 711 notifies the reset frame generator 722 that the duration of an EIFS is shorter than the sum of the ACK frame reception time and the duration of an SIFS, the reset frame generator 722 generates a reset frame such as a CF-end frame or a QOS-null frame. The reset frame transmitter 721 transmits the reset frame generated by the reset frame generator 722 to the WLAN an SIFS after the reception of an ACK frame. The information inserter 723 receives the EPP information set by the calculator 712 and inserts the EPP information into a PHY header which is of a data frame and has a legacy format. The frame transmission unit 730 transmits the data frame into which the EPP information is inserted.

The HT station according to the current embodiment of the present invention has been described above as transmitting a single data frame and receiving an ACK frame in return for the single data frame. However, the present invention can also be applied to a frame exchange sequence where an HT station transmits a plurality of data frames and receives a block ACK frame in return for the data frames. This will now be described in detail with reference to FIGS. 9 and 10.

Figure 9:
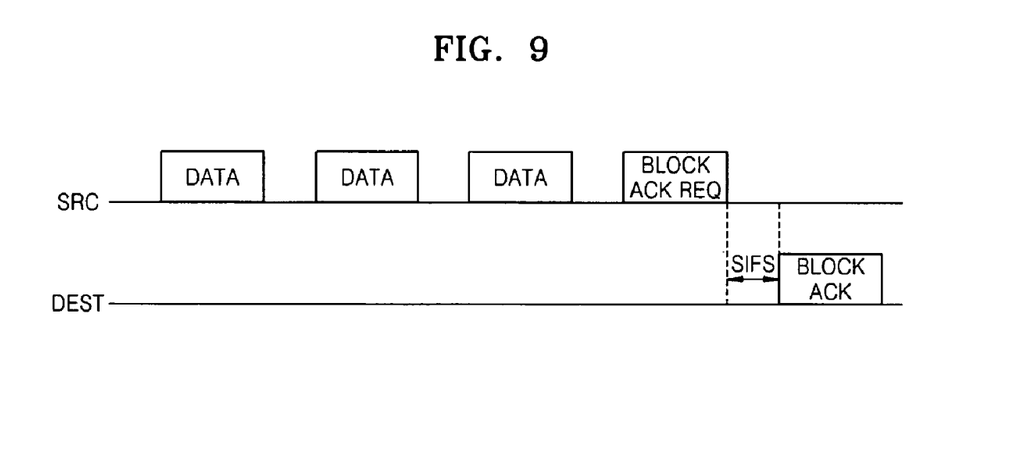
FIG. 9 is a diagram for explaining a method of guaranteeing fairness regarding access to a medium among a plurality of stations in a sequence where a block ACK frame is used, according to an exemplary embodiment of the present invention.

FIG. 9 is a diagram for explaining a method of guaranteeing fairness regarding access to a medium among a plurality of stations in a sequence where a block ACK frame is used, according to an exemplary embodiment of the present invention. In general, a transmitting station transmits a single data frame and receives an ACK frame in return for the single data frame. However, referring to FIG. 9, a transmitting station may transmit a plurality of data frames and issue a request for information indicating whether each of the plurality of data frames has been successfully received by a receiving station. Then the receiving station may transmit a block ACK frame in return for all the plurality of data frames to indicate that all the plurality of frames have been successfully received by the receiving station. In this case, a PHY header which is of the first frame of the plurality of data frames and has a legacy format includes EPP information which expires when the transmission of the block ACK frame is concluded, and the transmitting station compares the duration of an EIFS with the sum of an ACK frame reception time and the duration of an SIFS and determines whether to transmit a reset frame based on the results of the comparison.

Figure 10:
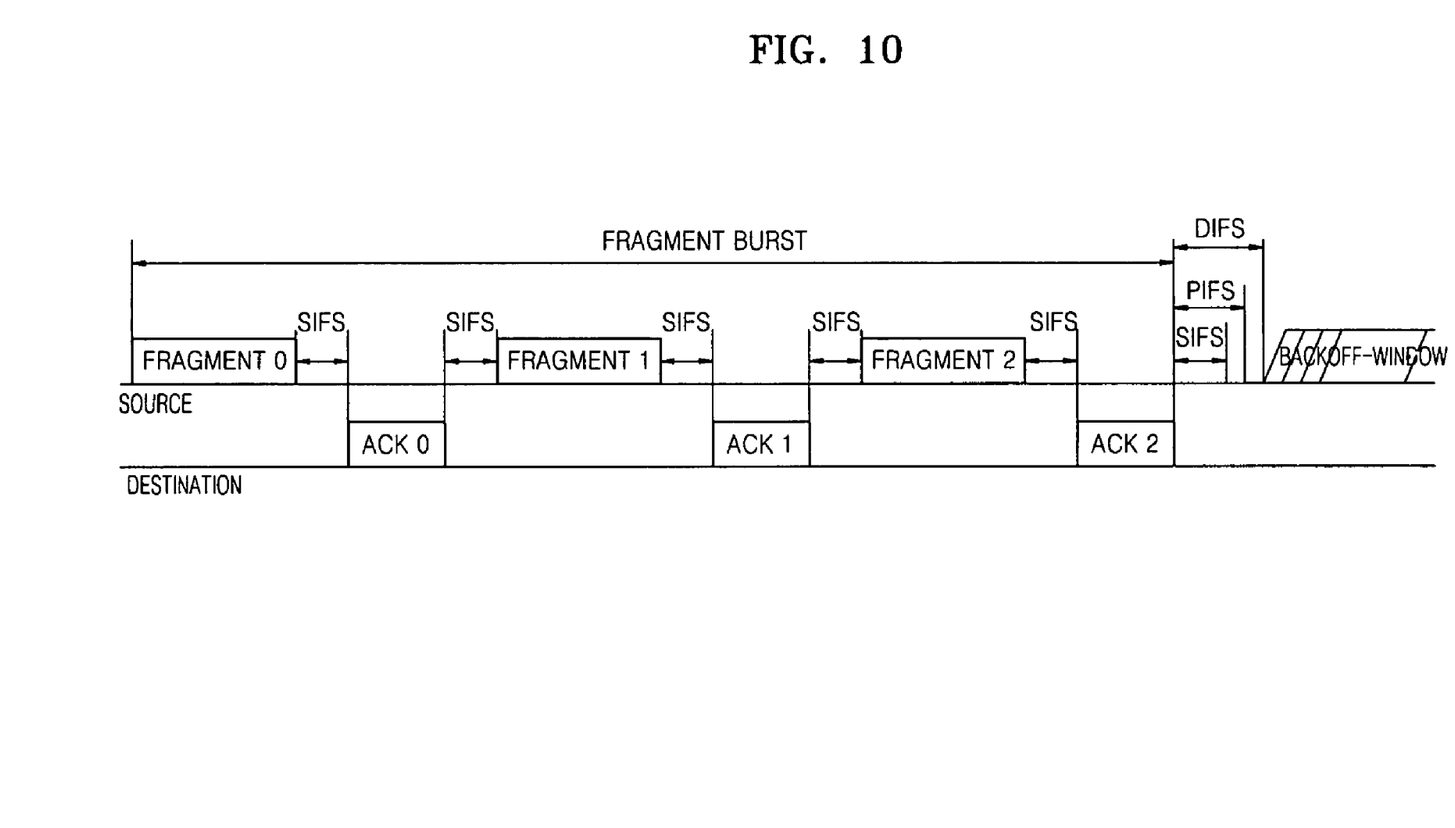
FIG. 10 is a diagram for explaining a method of guaranteeing fairness regarding access to a medium among a plurality of stations in a sequence where a plurality of fragment frames are transmitted, according to an exemplary embodiment of the present invention.

FIG. 10 is a diagram for explaining a method of guaranteeing fairness regarding access to a medium among a plurality of stations in a frame exchange sequence where a plurality of fragment frames are transmitted, according to an exemplary embodiment of the present invention. Referring to FIG. 10, a transmitting station divides a single frame into three fragment frames, i.e., zeroth through second fragment frames, and transmits the zeroth through second fragment frames. Then a receiving station respectively transmits zeroth through second ACK frames in return for the zeroth through second fragment frames, instead of transmitting one ACK frame in return for all of the zeroth through second fragment frames. In the current embodiment of the present invention, like in the previous embodiment illustrated in FIG. 9, a PHY header which is of the zeroth fragment frame and has a legacy format includes EPP information which is set to expire when the transmission of the second ACK frame is concluded. Then the transmitting station compares the duration of an EIFS with the sum of the ACK frame reception time and the duration of an SIFS and determines whether to transmit a reset frame based on the results of the comparison.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage.

According to the present invention, when a transmitting HT station transmits a frame having an HT format in a WLAN environment where a plurality of HT stations and a plurality of legacy stations coexist, a legacy station can contend for access to a medium under the same conditions as other HT stations without making additional changes to the legacy station.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of providing information regarding medium access control (MAC) to a plurality of stations in a wireless local area network (WLAN) where a plurality of high throughput (HT) stations and a plurality of legacy stations coexist, the method comprising:

adaptively generating information that allows legacy and HT stations which receive a data frame having an HT format to simultaneously participate in contention for use of a medium according to a length of an acknowledgement (ACK) frame, transmitted in response to the data frame; and transmitting the adaptively generated information via a frame having a format that can be interpreted by the legacy and HT stations, wherein the adaptively generating comprises calculating a beginning point of an extended interframe space (EIFS) of the legacy stations which receive the data frame so that all stations which receive the data frame can initiate a backoff operation at a same time and inserting the information indicating the calculated beginning point into a physical layer (PHY) header having a legacy format of the data frame, wherein each of the legacy stations is one of an IEEE 802.11a, an IEEE 802.11b station and an IEEE 802.11g station, and wherein the WLAN uses a legacy format for any ACK frame regardless of whether the format of data frame relevant to the ACK frame is HT or legacy.

2. The method of claim 1, wherein the beginning point of the EIFS of the legacy stations is a time when transmission of the data frame is concluded.

3. The method of claim 1, wherein the ACK frame having the legacy format is a block ACK frame transmitted in response to a plurality of frames, the data frame is a first frame of the plurality of frames, the beginning point of the EIFS of the legacy stations is a time when transmission of a last frame of the plurality of frames is concluded.

4. The method of claim 1, wherein the data frame is a first fragment frame of a plurality of fragment frames, the ACK frame having the legacy format is an ACK frame transmitted in response to a last fragment frame of the plurality of fragment frames, the beginning point of the EIFS of the legacy stations is a time when transmission of the last fragment frame of the plurality of fragment frames is concluded.

5. The method of claim 1, wherein the WLAN is an infrastructure basic service set (BSS) or an independent basic service set (IBSS).

6. The method of claim 1, wherein the HT stations are multi-input-multi-output (MIMO) stations.

7. A non-transitory computer-readable recording medium storing a computer program for executing a method of providing information regarding medium access control (MAC) to a plurality of stations in a wireless local area network (WLAN) where a plurality of high throughput (HT) stations and a plurality of legacy stations coexist, the method comprising:

adaptively generating information that allows legacy and HT stations which receive a data frame having an HT format to simultaneously participate in contention for use of a medium according to a length of an acknowledgement (ACK) frame, transmitted in response to the data frame; and transmitting the adaptively generated information via a frame having a format that can be interpreted by the legacy and HT stations, wherein the adaptively generating comprises calculating a beginning point of an EIFS of the legacy stations which receive the data frame so that all stations which receive the data frame can initiate a backoff operation at a same time and inserting the information indicating the calculated beginning point into a physical layer (PHY) header having a legacy format of the data frame, wherein each of the legacy stations is one of an IEEE 802.11a, an IEEE 802.11b station and an IEEE 802.11g station, and wherein the WLAN uses a legacy format for any ACK frame regardless of whether the format of data frame relevant to the ACK frame is HT or legacy.

8. A high throughput (HT) station which transmits a data frame having an HT format to a wireless local area network (WLAN) where a plurality of high throughput (HT) stations and a plurality of legacy stations coexist, the HT station comprising:

an information generation unit which adaptively generates information that allows legacy and HT stations which receive the data frame to simultaneously participate in contention for use of a medium according to a length of an acknowledgement (ACK) frame, transmitted in response to the data frame;

an information providing unit which transmits the adaptively generated information to the WLAN as a frame having a format that can be interpreted by the legacy and HT stations;

a calculation unit which calculates a beginning point of an extended interframe space (EIFS) of the legacy stations which receive the data frame so that all stations which receive the data frame can initiate a backoff operation at a same time; and an information inserter which insers the information indicating the calculated beginning point into a physical layer (PHY) header having a legacy format of the data frame, wherein each of the legacy stations is one of an IEEE 802.11a, an IEEE 802.11b station and an IEEE 802.11g station, and wherein the WLAN uses a legacy format for any ACK frame regardless of whether the format of data frame relevant to the ACK frame is HT or legacy.

9. The HT station of claim 8, wherein the calculation unit sets the beginning point of the EIFS of the legacy stations to be a time when transmission of the data frame is concluded.

10. The HT station of claim 8, wherein the ACK frame having the legacy format is a block ACK frame transmitted in response to a plurality of frames, the data frame is a first frame of the plurality of frames, the calculator sets the beginning point of the EIFS of the legacy stations to be a time when transmission of a last frame of the plurality of frames is concluded.

11. The HT station of claim 8, wherein the data frame is a first fragment frame of a plurality of fragment frames, the ACK frame having the legacy frame is an ACK frame transmitted in response to a last fragment frame of the plurality of fragment frames, the calculator sets the beginning point of the EIFS of the legacy stations to be a time when transmission of the last fragment frame of the plurality of fragment frames is concluded.

12. The HT station of claim 8, wherein the WLAN is an infrastructure basic service set (BSS) or an independent basic service set (IBSS).

13. The HT station of claim 8, wherein the HT stations are multi-input-multi-output (MIMO) stations.

* * * * *